United States Patent Office 3,157,515
Patented Nov. 17, 1964

3,157,515
PASTRY MIX HAVING THIOLATED GELATIN INCORPORATED THEREIN AND METHOD UTILIZING SAID MIX
Lewis M. Berkowitz, Yonkers, N.Y., and Myron D. Shoaf, Danbury, and Ralph E. Schachat, Bloomfield, Conn., assignors to General Foods Corporation, White Plains, N.Y., a corporation of Delaware
No Drawing. Filed Nov. 9, 1961, Ser. No. 151,166
11 Claims. (Cl. 99—92)

This invention related to an improved pastry composition and a method for preparing the composition. More specifically, it relates to a cake mix incorporating thiolated gelatin as a novel ingredient thereof.

Cakes which are prepared for home use may conventionally be classified into two categories: foam batter cakes, such as angel food cake, and shortening cakes, typified by a chocolate cake. Foam batter cakes and shortening cakes both incorporate as an important ingredient thereof egg white, which will vary in amount in accordance with the particular cake formed. Prepared cake mixes are present in profusion in the commercial market, and contain egg white in a dry form as one of their principal ingredients.

There are, however, numerous disadvantages to the use of egg whites when the cake to incorporate the egg whites is prepared from a commercial cake mix. First, there are wide variations in the price of egg whites from time to time. This makes it difficult for producers of packaged cake mixes to market their product economically and introduces a high degree of risk into the cake mix field. Furthermore, egg white is a relatively unstable raw material, even in dried and powdered form. Fresh egg white must be stored under refrigeration if it is not to be used immediately. Dried egg white possesses a comparatively short shelf life unless it is to be treated by methods such as deoxygenation by techniques involving the use of enzyme preparations. It is not uncommon that stored egg whites frequently develop undesirable and unpleasant odors. Another disadvantage to the use of egg whites in a powdered and dried form is that the composition of the natural egg white, itself, may vary considerably in accordance with the season of the year in which the egg was laid. Nonuniformity in the composition of the egg white results in varying whipping characteristics of the dried egg white.

The difficulties which are present in the use of dried egg white in a cake batter are accentuated when a foam batter type of cake, such as an angel food cake, is to be prepared. The stability of a foam batter during and after baking is erratic. An otherwise desirable foam batter expansion during baking can be accompanied by a reduction in the stability of the batter during and after baking such that collapse or cupping of the baked goods will be encountered. If the response of a foam batter to expansion during baking is too great, the stability of the foam batter during and after baking suffers. Whipping agents that are effective in developing a good foam can also serve to decrease the stability of the foam batter and of a cake baked therefrom.

Various attempts have been made to treat egg white to enable it to be stored for long periods of time so that when it is used by housewives, bakers and compounders of baking formulas, it does not possess the disadvantages set forth hereinbefore. For example, various materials have been added as preservatives, but these preservatives have proved an unacceptable solution. Other materials have been utilized as egg white substitutes, for example, soybean protein, but such substitutes have generally proved at least partly unsatisfactory because of poor taste, undesirable texture, low overrun, disagreeable odor, poor whipping qualities, high cost, etc. Thus, those skilled in the art of compounding cake mix formulas have not heretofore been able to find a highly desirable substitute for dried, powdered egg white in pastry compositions.

In addition to the aforesaid undesirable characteristics of egg whites, it is believed advantageous to provide a substitute for the texture which has been incorporated into cakes formed from a basic combination of egg albumen, flour and sugar. While such a texture has proved highly acceptable, other textures formed from substitutes for egg albumen in an egg albumen-flour-sugar combination may well prove even more acceptable to consumers.

It is, therefore, a primary object of this invention to provide a substitute for egg whites in foam batter and shortening type pastry formulations which will overcome the objections to other such egg white substitutes and enable a baker or housewife to produce an improved cake. In particular, it is an object of this invention to produce improved foam batter and shortening-type cake mixes, cakes, and methods of making them.

It is a further object of this invention to provide a pastry product having a texture which is different from that which results from a conventional egg albumen-flour-sugar system.

The present invention is based on the discovery that thiolated gelatin may be used as an egg white substitute in pastry mixes and products. Thiolated gelatin has many advantages over egg white when substituted for the latter in packaged cake mixes. Thiolated gelatin is relatively stable in comparison with dried or fresh egg whites. Thiolated gelatin can be stored for long periods without the need for special treatment, and during such storage does not develop malodorous characteristics. It is a uniform product which can be reproduced with exactitude; consequently, its composition does not vary in accordance with the season of the year and its price does not fluctuate with weather conditions and the like, as is the case with egg whites.

Thiolated gelatin is utilized in conjunction with an oxidizing agent therefor so that the gelatin will harden or set and thereby maintain the full volume of the expanded cake. Other elements which are typically used in the formulation of a cake mix and a cake baked therefrom are flour and moisture. Preferably a sweetening agent such as sugar is used, as well as salt, flavoring, and an acidifying agent such as cream of tartar. A novel cake mix according to the present invention will, consequently, generally include all of these ingredients as well as flour.

Since it is presently believed that a major use of egg white substitutes such as thiolated gelatin will be in foam batter type cakes, as exemplified by an angel food cake, a typical angel food cake mix is set forth hereinafter:

| | Parts by weight |
|---|---|
| Egg whites | 600 |
| Finely granulated sugar | 600 |
| Cake flour | 218 |
| Cream of tartar | 6.5 |
| Vanilla | 6 |
| Salt | 3.5 |

A cake is conventionally prepared from the above ingredients by first adding water to the dried, powdered egg whites and beating the egg whites for at least one minute. A batter is prepared from a mixture of sifted flour, vanilla, cream of tartar, salt and sugar. The beaten egg whites are then folded into the batter and the whole is baked in an oven at a temperature of about 350° F. for approximately one-half hour.

It is in a cake such as the angel food cake described hereinbefore that the substitution, in whole or in part, of thiolated gelatin and an oxidizing agent therefor finds an important use. However, a shortening type of cake mix may also advantageously utilize thiolated gelatin and an oxidizing agent. A typical shortening type cake is prepared by mixing together egg whites, water, flour, sugar, shortening, and a leavening agent as typified by baking soda. Other ingredients which are conventionally included in the shortening type cake mix and cake are an acidifying agent, typically cream of tartar, and other additives, such as flavoring and coloring agents. The mixed, non-airy mass, when baked, is characterized by its comparative shortness and by its tenderness.

Consequently, a novel pastry mix and pastry product produced in accordance with the practice of the present invention will comprise thiolated gelatin, an oxidizing agent for the thiolated gelatin, moisture, and flour. Sweetening and acidifying agents, in addition to coloring and flavor agents, may also be added. A leavening agent may optionally be included in the mix and product. When a shortening type of cake is to be prepared, a shortening will be added; when a foam batter type of cake is to be produced, the shortening agent will be omitted at least in part.

Thiolated gelatin which is utilized in the practice of our process, pastry mix and pastry product may be purchased commercially under the trademark, "Thiogel," or it can be prepared by various techniques including that described by Benesch and Benesch in Proc. Nat'l Acad. Sci. U.S., 44 (9) 848–53 (1958). In accordance with one process for producing thiolated gelatin, gelatin at a pH of 7.5 is treated with acetyl homocysteine thiolactone and then alternately with small portions of silver nitrate (as a catalyst) and sodium hydroxide to keep the pH at 7.5. At the conclusion of the reaction, which takes about one hour, the pH is lowered to 2.5 to 3.0 by the addition of dilute nitric acid, and the thiolated gelatin precipitates. The gelatin precipitate is collected and the aqueous solution discarded. The gummy precipitate is dissolved in acidic thiourea and ion exchanged through Amberlite I.R. 120. The silver now becomes complexed in the solution and may be removed with other undesirable cations. The pH is adjusted to 7.0 and ion exchanged through Amberlite I.R. 400. After dialysis, the material is dried in a freeze dryer. Carbon dioxide protection is required from the first ion exchange step, which removes undesirable cations, through the second exchange step, which removes undesirable anions, especially homocysteic acid, until the dried material is obtained. Of course, another inert gas may be substituted for the carbon dioxide.

Thiolated gelatin which may be employed in the practice of this invention is prepared from a variety of gelatins as starting materials. Thus, the gelatin may have a bloom of 0 to about 250, preferably within a range of 75 to 200, and typically 75. The gelatin as a 6% solution measured at $60 \pm 0.1°$ C. will have have a viscosity of, for example, 12 to 50 mp. preferably 30 to 40, and typically 35 mp. The gelatin utilized as a starting material in the preparation of thiolated gelatin may have been extracted from a variety of raw materials, including pigskins, ossein, lime splits, etc., by any of a variety of processes. The thiolated gelatin employed may contain free mercapto (—SH) groups. The number of mercapto groups will about 2 to 20 preferably 10 to 15 mercapto equivalents per mole of gelatin, the gelatin being assumed to have an average molecular weight of 50,000.

Thiolated gelatin oxidizing agents which may be employed in the practice of this invention comprise: oxygen, including oxygen found in air; inorganic peroxides, including hydrogen peroxide and calcium peroxide; organic hydroperoxides and dihydroperoxides, including cumene hydroperoxide, tertiary butyl hydroperoxide, 2,5-dimethyl-hexane-2,5-dihydroperoxide, etc.; halates, i.e., bromates, iodates, chlorates, etc., typified by potassium bromate; hypohalites, typified by sodium hypochlorite, etc.; perhalates, typified by periodic acid, sodium perchlorate and potassium perchlorate; persulfates, including potassium persulfate, sodium persulfate, etc.; metallic ions in their oxidized states, including ferric ion either in the free state, e.g., ferric chloride, or in the complex state, e.g., potassium ferricyanide; cupric ion, e.g., copper sulfate; organic oxidizing agents, including dehydroascorbic acid, and other oxidizing compounds including bromosuccinimide, etc.

Some of these thiolated gelatin-oxidizing agents may be assisted in their action by ambient air or other oxidizing agents. Some of the agents may function through the intermediary of a heavy metal salt, e.g., an iron or a copper salt.

Of course, it will be apparent that when the pastry mix and resulting pastry product are desired to be edible, it will be requisite that the oxidizing agent for the thiolated gelatin be non-toxic and non-injurious on ingestion. Alternatively, the oxidizing agent will be one which, although initially deleterious, is converted into a non-toxic substance during the formation of the pastory product. Thus, toxic potassium persulfate and calcium peroxide are reduced to innocuous potassium sulfate and calcium hydroxide by their reaction with the thiolated gelatin.

Preferred oxidizing agents have been determined to be hydrogen peroxide and calcium peroxide. However, atmospheric oxygen can also be utilized to oxidize the thiolated gelatin, such oxidation being advanced by whipping or otherwise permeating the thiolated gelatin with air. Pure oxygen can also be used as an appropriate oxidizing agent.

It has further been discovered that the speed of the reaction between the thiolated gelatin and certain oxidizing agents, e.g., persulfates including potassium persulfate, may be substantially increased by heating the mixture of the thiolated gelatin with the oxidizing agent. Preferably, the mixture will be brought to a temperature range of about 60° to 100° C.

The proportion of oxidizing agent to thiolated gelatin will depend on the particular oxidizing agent utilized and the conditions at which the gelatin-agent reaction is maintained. Other factors are the number of mercapto groups per unit weight of gelatin, the time within which it is desired that the gelatin set up and whether oxidation is assisted by air contact (whipping, etc.). Gelling takes place upon oxidation, which converts S—H bonds in the thiolated gelatin to S—S crosslinking bonds, with the splitting out of hydrogen to form water. It has been found that a preferred range for hydrogen peroxide is from about 0.04 to 0.40 part, say 0.20 part of oxidizing agent be employed per 100 parts of thiolated gelatin (13 to 15 mercapto groups per mole (estimated at 50,000 grams) of thiolated gelatin).

A typical foam batter type cake, e.g., an angel food cake, will contain in its mix approximate weights of the following ingredients per 100 parts of thiolated gelatin:

| Gelatin Oxidizing Agent sufficient to accomplish oxidation | Minimum | Maximum | Preferred |
| --- | --- | --- | --- |
| Moisture | 1,050 | 1,300 | 1,170 |
| Flour | 325 | 400 | 363 |
| Sweetening Agent | 850 | 1,150 | 1,000 |

A preferred cake mix where the cake to be produced is a shortening type cake will contain the following ingredients per 100 parts of thiolated gelatin. It is understood that the parts in this table and in the above table are by weight, and that other optional ingredients such as coloring and flavoring agents may also be present.

| Gelatin Oxidizing Agent sufficient to accomplish oxidation | Minimum | Maximum | Preferred |
| --- | --- | --- | --- |
| Moisture | 5,250 | 6,400 | 5,830 |
| Flour | 3,100 | 3,800 | 3,500 |
| Sweetening Agent | 3,800 | 4,600 | 4,170 |
| Shortening | 270 | 1,200 | 900 |
| Leavening Agent | 80 | 230 | 150 |

Preferred sweetening agents which may be employed are a sugar, such as sucrose, but other sweetening agents may be used if desired. Flour which may be employed in a pastry mix and process include wheat flour, corn flour, and flour produced from a variety of sources. Leavening agents which may be employed include baking powder, a mixture including sodium bicarbonate and an acidic substance such as tartaric acid, cream of tartar (sodium potassium tartrate), mono calcium phosphate, and the like. Those shortenings which may be utilized when the product cake is of the shortening type include hydrogenated vegetable oils such as those commercially available.

In forming a cake batter from a cake mix which includes thiolated gelatin and an oxidizing agent for the thiolated gelatin, conventional procedures are followed, water or preferably milk being added to the mix with agitation. The primary novelty in the method of forming a pastry product in accordance with the present disclosure lies in the incorporation into the pastry batter of thiolated gelatin and a thiolated gelatin oxidizing agent either wholly or in part as a replacement for the egg whites normally utilized in forming such a batter.

It is a particular feature of this invention that mixes prepared from the ingredients hereinbefore named are particularly characterized by their extended storage life and by their ability to form pastry products which are highly acceptable to the taste. Cakes prepared from the mixes disclosed herein possess many desirable qualities. In particular, a foam batter type of cake has been found to possess novel characteristics not heretofore obtained in any cake of this type. An angel food cake, for example, has a texture which is more elastic and resilient than that of prior art cakes and such texture has been found to be preferred by consumers when compared with cakes which use egg whites in their entirety.

The invention will be better understood by reference to the following specific examples, which illustrate the practice of the invention. In these examples the product cakes have been appraised on the basis of a so-called Anderson grade. The Anderson grade is an arbitrary, visually determined number which measures the general appearance and grain structure of a foam batter cake. On the Anderson scale, which extends from 0 to 14, a rating of 1 is unsatisfactory; 3 is poor; 6 is fair; 9 is good; 12 is very good; and 14 is excellent. In the hands of those skilled-in-the-art, this scale represents a convenient and readily reproducible technique for judging the desirability of a cake.

Example I

This example serves as a standard for those which follow. A conventional package of white cake mix was folded into a mixture of 290 ml. of water and 60 grams of egg white, which mixture had previously been whipped in a mixing bowl. The contents of a cake mix package weighed 539 grams and comprise, by weight, powdered sugar—45±5%, cake flour—35±5%, shortening—10 to 13%, non-fat dry milk solids—2½%, dextrose—2%, baking powder 1 to 2%, and small quantities of salt, vegetable gum, artificial flavor and emulsifiers (propylene glycol monostearate and lecithin). The so-blended white cake batter was placed in a pan and baked at 365° F. for 32 minutes in a Dispatch oven. The resulting cake was found to have a volume of 1,373 cc., a crumb pH of 7.50 and an Anderson grade of 9.

Example II

The process set forth in Example I was repeated, except that 6.3 grams of commercial "Thiogel" thiolated gelatin was substituted for the 60 grams of egg white used in Example I. Air was used as the oxidizing agent. The amount of water used was increased from 290 to 350 ml. The resulting white cake was substantially indistinguishable from the cake described in Example I. It had the same cake volume, the same crumb pH, and the same Anderson grade.

Example III

In this example the procedure of Example I was duplicated, except that in place of the 60 grams of egg white, 60 ml. of 10% solution of thiolated gelatin was employed. Air was again used as the oxidizing agent. The resulting cake had a volume of 1383 cc., a crumb pH of 7.19 and an Anderson grade of 8.

Example IV

A sugar-flavor mix was made by dry-blending 320 grams of 6X sugar and 16 grams of cake flour. 320 cc. of 10% thiolated gelatin solution plus a solution of 55 cc. of saturated potassium chlorate solution plus 25 cc. of water was whipped in a Mixmaster and the flour and sugar folded in. The mixture was allowed to stand 30 minutes and was then baked at 375° F. for 35 minutes. An angel food type cake was obtained which was 55 mm. in height and which held up well in the oven, where it did not liquify or collapse. The cake was cooled upside down and had a texture which resembled angel food cake but which was more elastic.

It will be apparent that such modifications and alterations of the subject matter disclosed hereinbefore as will occur to one skilled in the art may be made without departing from the scope of the invention. It is desired, therefore, that such changes be considered as falling within the purview of the invention, which is to be limited only by the scope of the following, appended claims.

What is claimed is:

1. A pastry mix, comprising thiolated gelatin having about 2 to 20 mercapto equivalents per mole of gelatin and flour.

2. A foam batter type pastry mix, comprising thiolated gelatin having about 2 to 20 mercapto equivalents per mole of gelatin and flour, the proportion by weight of flour to thiolated gelatin being about 325 to 400 parts of flour to 100 parts of thiolated gelatin.

3. A shortening type pastry mix, comprising thiolated gelatin having about 2 to 20 mercapto equivalents per mole of gelatin and flour, the proportion by weight of flour to thiolated gelatin being about 3100 to 3800 parts flour to 100 parts of thiolated gelatin.

4. A pastry mix comprising thiolated gelatin having about 2 to 20 mercapto equivalents per mole of gelatin, a thiolated gelatin oxidizing agent and flour.

5. A pastry mix as claimed in claim 4 in which said thiolated gelatin oxidizing agent is an inorganic peroxide.

6. A pastry mix as claimed in claim 5, in which said inorganic peroxide is selected from the group consisting of hydrogen peroxide and calcium peroxide.

7. A pastry mix as claimed in claim 4, in which said thiolated gelatin oxidizing agent is an inorganic halate.

8. The method of preparing a baked pastry product, which comprises commingling thiolated gelatin having about 2 to 20 mercapto equivalents per mole of gelatin and a thiolated gelatin oxidizing agent, blending the mixture with flour and other conventional pastry forming ingredients and sufficient water to form a batter, and baking the batter.

9. The method of preparing a baked pastry product, which comprises whipping thiolated gelatin having about 2 to 20 mercapto equivalents per mole of gelatin with air, blending the whipped thiolated gelatin with flour and other conventional pastry forming ingredients and sufficient water to form a batter, and making the batter.

10. The method recited in claim 8, in which said thiolated gelatin oxidizing agent is selected from the group consisting of hydrogen peroxide and calcium peroxide.

11. A foam batter type pastry mix, comprising thiolated gelatin having about 2 to 20 mercapto equivalents per mole of gelatin, a thiolated gelatin oxidizing agent selected from the group consisting of hydrogen peroxide and calcium peroxide, and flour, the proportion by weight of flour to thiolated gelatin being about 325 to 400 parts of flour per 100 parts of thiolated gelatin, and the proportion by weight of thiolated gelatin oxidizing agent to thiolated gelatin being about .04 to .40 part of oxidizing agent per 100 parts of thiolated gelatin.

References Cited in the file of this patent

UNITED STATES PATENTS

| | | |
|---|---|---|
| 2,176,080 | Katzman | Oct. 17, 1939 |
| 2,243,868 | Katzman | June 3, 1941 |
| 2,802,741 | Weaver et al. | Aug. 13, 1957 |
| 2,916,380 | Finucane et al. | Dec. 8, 1959 |
| 2,929,715 | Sutton | Mar. 22, 1960 |